US012130575B2

(12) United States Patent
Assenheimer et al.

(10) Patent No.: US 12,130,575 B2
(45) Date of Patent: Oct. 29, 2024

(54) DETERMINING THE EXISTENCE OF POINT DEFECTS IN PRINT APPARATUSES

(71) Applicant: Hewlett-Packard Development Company, L.P., Spring, TX (US)

(72) Inventors: Michel Assenheimer, Nes Ziona (IL); Asaf Shoshani, Nes Ziona (IL); Naama Barak, Nes Ziona (IL); Dorit Shalev, Nes Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 32 days.

(21) Appl. No.: 18/051,333

(22) Filed: Oct. 31, 2022

(65) Prior Publication Data

US 2024/0142909 A1 May 2, 2024

(51) Int. Cl.
*G03G 21/00* (2006.01)
*G03G 15/01* (2006.01)

(52) U.S. Cl.
CPC ..... *G03G 21/0094* (2013.01); *G03G 15/0163* (2013.01)

(58) Field of Classification Search
CPC ........... G03G 15/0266; G03G 15/5037; G03G 21/0094
See application file for complete search history.

(56) References Cited

U.S. PATENT DOCUMENTS

| | | | | |
|---|---|---|---|---|
| 2008/0267646 A1* | 10/2008 | Oron | G03G 15/5037 | 399/48 |
| 2015/0309436 A1* | 10/2015 | Gila | G03G 15/0266 | 399/115 |
| 2019/0146368 A1* | 5/2019 | Moalem | G03G 15/5037 | 399/50 |
| 2019/0346799 A1* | 11/2019 | Grinstein | G03G 21/1647 | |

* cited by examiner

*Primary Examiner* — Jessica L Eley
(74) *Attorney, Agent, or Firm* — Jordan IP Law, LLC

(57) ABSTRACT

A print apparatus is disclosed. The print apparatus includes a photoconductive surface to receive a latent image representative of an image to be printed onto a printable substrate; a charging component to apply a voltage is to be applied to the photoconductive surface as the charging component moves relative to the photoconductive surface; and processing circuitry to receive data indicative of a measurement of a first current resulting from the voltage applied by the charging component; determine, responsive to detecting an increase in the measured first current relative to a reference current, the increase being greater than a first defined threshold current, that there exists a point defect under affecting the latent image; and generate instruction data responsive to determining that there exists a point defect under affecting the latent image. A method and a machine-readable medium are also disclosed.

19 Claims, 5 Drawing Sheets

DETERMINING THE EXISTENCE OF POINT DEFECTS IN PRINT APPARATUSES

BACKGROUND

One example of a printing technology that may be implemented in the field of printing is liquid electrophotography (LEP). LEP printing may involve interactions between a series of surfaces, such as the surfaces of rollers, to enable transfer of electrically-charged liquid ink via the rollers to a substrate.

If one the surfaces or rollers is defective, then a print quality defect may occur in an image printed on the substrate using the defective surface or roller.

BRIEF DESCRIPTION OF DRAWINGS

Examples will now be described, by way of non-limiting example, with reference to the accompanying drawings, in which.

DETAILED DESCRIPTION

Figure 1:
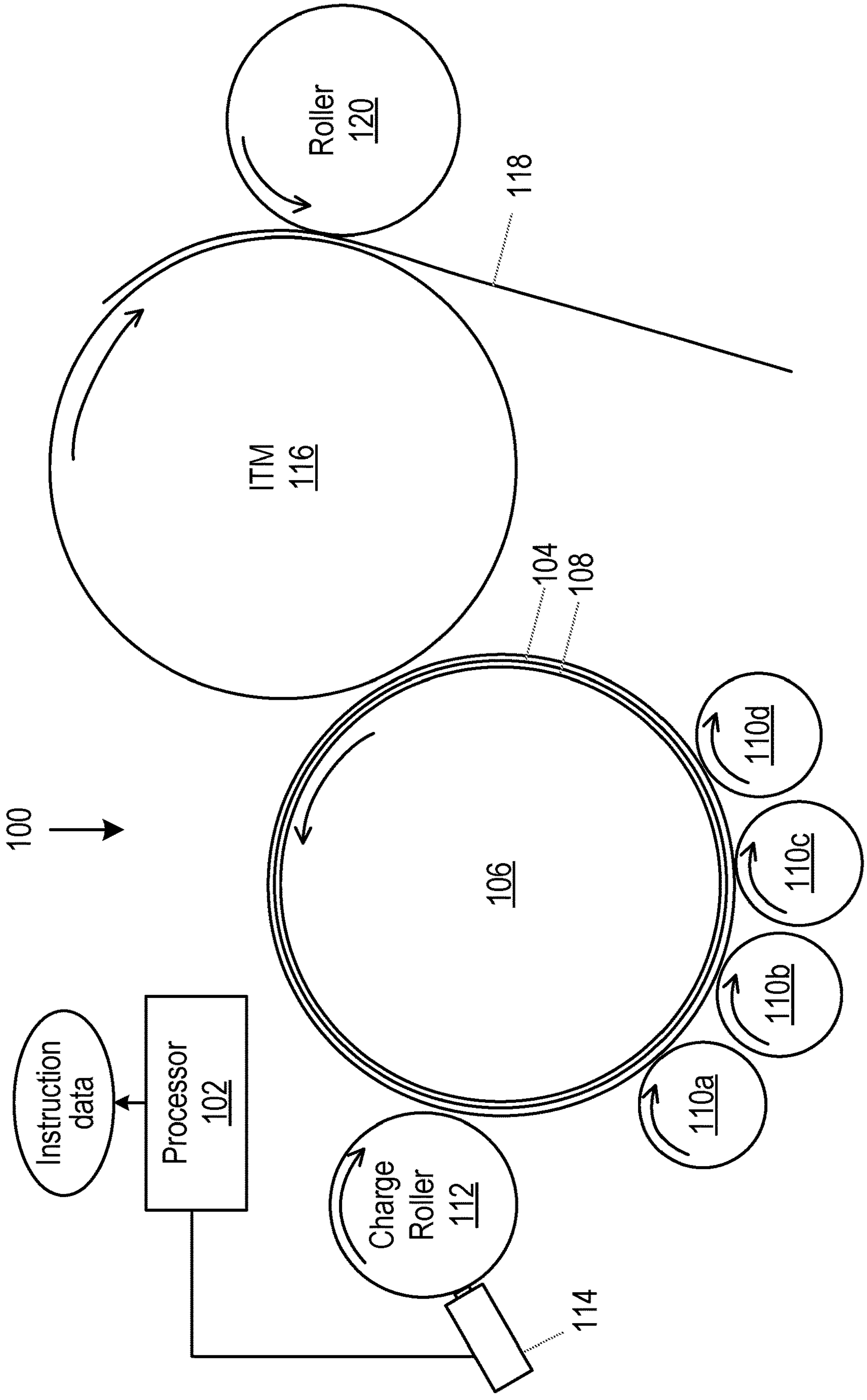
FIG. 1 is a schematic illustration of an example of a print apparatus.

Examples disclosed herein provide a mechanism by which a defect (e.g., a point defect) associated with a component of a print apparatus, such as a photoconductive surface, can be detected so that appropriate remedial action can be taken. Moreover, examples of the present disclosure enable the detection of a point defect affecting (e.g., adversely affecting) the photoconductive surface and/or a latent image received on the photoconductive surface of a print apparatus The present disclosure relates to various printing technologies. One example of a print apparatus in respect of which the present disclosure is relevant, is a liquid electrophotography (LEP) print apparatus. In a liquid electrophotography apparatus, print agent, such as ink, may pass through a print agent application assembly, such as an ink developer unit. Each ink developer unit handles print agent of a particular color, so an LEP printing system may include, for example, four ink developer units or seven ink developer units, depending on the number of colors to be printed. Print agent from an ink developer unit is selectively transferred from a print agent transfer roller—also referred to as a developer roller—of the ink developer unit in a layer of substantially uniform thickness to a surface of a photoconductor. During use, the photoconductor surface is electrostatically charged, and a writing head (e.g., a laser) is used to selectively discharge portions of the photoconductor surface to form a latent image representative of an image to be printed. The selective transfer of print agent is achieved through the use of an electrically-charged print agent, also referred to as a "liquid electrophotographic ink". As used herein, a "liquid electrophotographic ink" or "LEP ink" generally refers to an ink composition, in liquid form, generally suitable for use in a liquid electrostatic printing process, such as an LEP printing process. The LEP ink may include chargeable particles of a resin and a pigment/colorant dispersed in a liquid carrier.

The LEP inks referred to herein may comprise a colorant and a thermoplastic resin dispersed in a carrier liquid. In some examples, the thermoplastic resin may comprise a copolymer of an alkylene monomer and a monomer selected from acrylic acid and methacrylic acid. In some examples, the thermoplastic resin may comprise a copolymer of an ethylene acrylic acid resin, an ethylene methacrylic acid resin or combinations thereof. In some examples, the thermoplastic resin may comprise an ethylene acrylic acid resin, an ethylene methacrylic acid resin or combinations thereof. In some examples, the carrier liquid is a hydrocarbon carrier liquid such as an isoparaffinic carrier liquid, for example Isopar-L™ (available form EXXON CORPORATION). In some examples, the electrostatic ink also comprises a charge director and/or a charge adjuvant. In some examples, the charge adjuvant includes aluminum di- or tristearate. In some examples, the liquid electrostatic inks described herein may be Electro Ink® and any other Liquid Electro Photographic (LEP) inks developed by HP Inc.

The photoconductor onto which print agent is selectively transferred is, in some examples, a replaceable component. In some examples, the photoconductor may comprise a sheet, a flexible substrate (e.g., a belt) or a foil that is wrapped around a roller, a drum or a series of rollers. In some examples, the component around which the flexible photoconductor is formed or wrapped may include a compressible layer, sometimes referred to as an 'underlayer'. The underlayer, which may be a soft, compliant layer, may be replaceable. In some examples, the whole component may be referred to as a photoconductor, and the photoconductor may have multiple layers. Over time, the photoconductor may become worn, leading to a reduction in the quality of printing that it is able to achieve. The photoconductor may then be removed and replaced with a new or different photoconductor.

In some cases, a print quality defect may occur in an image printed using the photoconductor as a result of a particular defect associated with the photoconductor. For example, a scratch in the surface of the photoconductor may affect the transfer of print agent, resulting in a print defect, such as an unwanted image artifact being present in the printed image. In another example, an object, a contaminant, a foreign body or other debris, such as a hair or dirt, may become trapped on, in or under the photoconductor, or under between layers of the photoconductor, such as between the underlayer and the photoconductor. Such debris may cause a bump or ridge to form in the photoconductor, affecting an otherwise smooth photoconductor surface, and this may result in a print quality defect sometimes referred to as a 'star mark'. Such a point defect may affect the surface of the photoconductor, for example by affecting the transfer of print agent, resulting in a print defect in the printed image. Such print quality defects can be avoided if the point defect can be located and removed from the photoconductor. However, if an operator of a print apparatus is not aware of the potential existence of such an object, or cannot locate the point defect, then the operator may unnecessarily remove and replace the photoconductor, resulting in an unnecessary waste of components, a waste of time reducing utilization of the print apparatus, and potentially increased costs for the consumer.

According to examples disclosed herein, potential point defects may be detected by measuring a current resulting from a voltage that is applied to the photoconductor by a charging component, as the photoconductor and the charging component are moved relative to one another. For example, a drum on which the photoconductor is mounted may be rotated relative to the charging component that is used to apply a voltage to the photoconductor as the drum is rotated, and a current resulting from the applied voltage is measured using the charging component. The charging component may, for example, include a current sensor within its power supply. As the charging component applied a voltage to the photoconductor, a resulting current is measured, and data indicative of the measured current can be processed and analyzed. The occurrence of a spike or peak in the measured current that is greater than a threshold (e.g., the noise level) may lead to the determination that the photoconductor has a point defect on, in or under its surface. Furthermore, in some examples, the occurrence of a spike in current at a particular point during the drum rotation may lead to a determination that a point defect (e.g., a contaminant, debris or other object) exists on, in or under the photoconductor at a location corresponding to the spike. As used herein, the term "point defect" is intended to refer to any defect associated with or adversely affecting a localized part of the surface of the photoconductor that generates a positive perturbation in the measured current. While the point defect may be located at a particular point on the photoconductor surface, the spike or peak in the measured current may correspond to a line along the photoconductor surface at a particular angle around the drum or roller. This is because the charging component applies a voltage in a line across the length of the photoconductor surface, rather than at individual points on the surface. As such, a point defect may, in some examples, be or include a line defect. Such a line defect may be caused by a "nip" in the photoconductor surface, when the photoconductor surface and the surface of another roller or drum come into contact with one another, at a so-called "nip area". In other examples, a point defect may be or include a surface defect, as the point defect affects the surface of the photoconductor.

Referring to the drawings, FIG. 1 is a simplified, schematic illustration of an example apparatus, such as a print apparatus 100. The print apparatus 100 may be an LEP print apparatus. The apparatus 100 includes a processor or processing circuitry 102 coupled to, and/or for controlling, various components of the print apparatus 100. The print apparatus 100 includes photoreceptor or photoconductor 104. The photoconductor 104 may, in some examples, comprise a substantially cylindrical roller having a photoconductive surface. In other examples, the imaging plate 104 may comprise a photoconductor formed on a drum or a roller 106, or multiple drums/rollers. In the example shown in FIG. 1, an intermediate layer, known as an underlayer 108 is located between the photoconductor 104 and the drum or roller 106. In some examples, the underlayer 108 may comprise an inner layer of the photoconductor 104.

A plurality of print agent application assemblies, or ink developer units are arranged around the photoconductor 104 and may be arranged such that a developer roller 110 of each ink developer unit is able to interact (i.e., transfer print agent to) the photoconductor. For clarity, in FIG. 1, just the developer roller 110*a*, 110*b*, 110*c*, 110*d* of each ink developer unit is shown. In the example shown, the print apparatus 100 includes four ink developer units and each ink developer unit may store and transfer print agent of a particular color (e.g., cyan, magenta, yellow and black). In some examples, the print apparatus 100 may include seven ink developer units while, in other examples, more or fewer ink developer units may be included.

The print apparatus 100 also includes a charging component which, in this example, comprises a charge roller 112 (e.g., a ceramic charge roller) to apply a voltage to the photoconductor 104. The photoconductor 104 may be considered to function as a capacitor to which a voltage is applied, and this creates a charge on the photoconductor 104. The voltage applied to the photoconductor may be AC, DC or a combination of both AC and DC. If an AC voltage is applied, it may have a defined frequency. In some examples, the print apparatus 100 may also include an electrometer 114 to measure a potential difference (e.g., a voltage) resulting from the voltage applied by the charging component 112 to the photoconductor 104. A corresponding current may be determined from the measured potential difference. The electrometer 114, which may be located at any position around the photoconductor 104, measures a voltage on the photoconductor once charged, and when the photoconductor is uncharged. In some examples, multiple electrometers 114 may be used; for example, a first electrometer may be used for taking measurements when the photoconductor 104 is charged, and a second electrometer may be used for taking measurements when the photoconductor 104 is discharged. It will be understood that the photoconductor drum/roller 106 has a length (and that the photoconductor 104 has a length which is the same or similar to that of the photoconductor drum/roller) and that the charge roller 112 may be sized appropriately to extend over the length of an imaging area of the photoconductor.

The print apparatus 100 shown in FIG. 1 also includes an intermediate transfer member (ITM) 116. The ITM 116 may, in some examples, comprise a substantially cylindrical roller or drum. The ITM 116 may include a print blanket (not shown) which, in some examples, may be replaceable. In other words, it may be intended that the print blanket is replaced by a new print blanket after a defined time or after a defined number of uses or upon the appearance of a print quality defect associated with the print blanket. The print blanket may, in some examples, comprise a flexible sheet wrapped and secured around the ITM 116, so as to receive print agent from the photoconductor 104.

A printable substrate 118, such as paper, for example, is brought into contact with the ITM 116. The printable substrate 118 may comprise a web substrate; in FIG. 1, however, just part of the printable substrate is shown. In other examples, printable substrate 118 may comprise individual sheets of material (e.g., paper). The substrate 118 may comprise a length of material onto which print agent may be transferred. Other rollers (such as the roller 120) may be provided to direct the substrate 118 through the print apparatus, and to apply force to the substrate. As the substrate 118 is brought into contact with the ITM 116 (or the print blanket, where present), print agent from the ITM may be transferred onto the substrate in the form of the intended image. The print agent transferred onto the substrate may be fixed, for example by the application of heat and/or pressure. In the example shown, the photoconductor drum/roller 106, the developer rollers 110, the charge roller 112, the ITM 116 and the roller 120 are rotatable in the directions indicated by the arrows shown. Other components (not shown) may be included in the print apparatus 100, such as components to enable heating, drying, ventilation, and the like.

As described in greater detail below, the processor 102 receives data indicative of a current resulting from a voltage applied by the charge roller 112 to the photoconductor 104 and, based on the data, the processor may generate instruction data.

Figure 2:
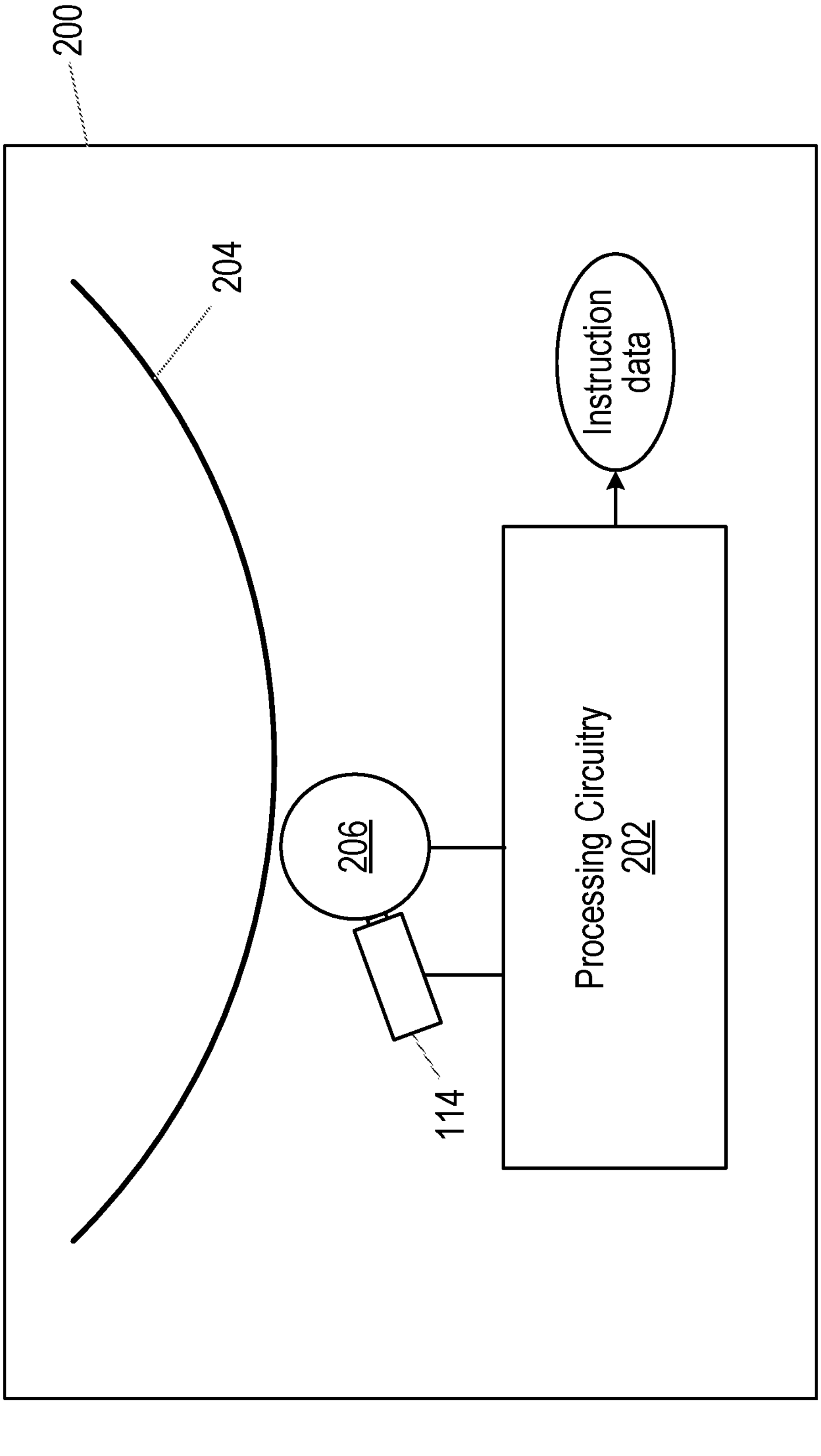
FIG. 2 is a schematic illustration of a further example of part of a print apparatus.

FIG. 2 is a schematic illustration of a further example of an apparatus 200 (e.g., a print apparatus). The print apparatus 200 is similar to the print apparatus 100 shown in FIG. 1; however, fewer components are shown in the apparatus 200. The print apparatus 200 comprises processing circuitry 202, a photoconductive surface 204 and a further component which, in this example, comprises a charging component 206, which may be the same as or similar to the charge roller 112. The photoconductive surface 204 is to receive a latent image representative of an image to be printed onto a printable substrate. The photoconductive surface 204 may, for example, comprise the photoconductor 104 or a surface thereof. The surface of the charging component 206 and the photoconductive surface 204 may be movable relative to one another. The charging component 206 and the photoconductive surface 204 may be in contact with one other, or may be separated from one another by an air gap, while remaining in electrical contact. According to various examples, the surface of the charging component 206 may rotate relative to the photoconductive surface 204, the photoconductive surface may rotate relative to the surface of the charging component, or the surface of the charging component and the photoconductive surface may rotate relative to one another. The charging component 206 is to apply a voltage to the photoconductive surface 204 as the charging component moves relative to the photoconductive surface. In some examples, charging may be achieved using other techniques, including for example, scorotron methods.

The processing circuitry 202 may comprise or be similar to the processor 102 shown in FIG. 1. The processing circuitry 202 is to receive data indicative of a measurement of a first current resulting from the voltage applied by the charging component 206. The first current may be measured using a component such as the electrometer 114, or using a component or circuitry associated with or forming part of the charging component 206 itself, such as a power supply attached to or associated with the charging component. In some examples, the first current may be measured using a current sensor, sometimes referred to as a current monitor, within or associated with a power supply used to apply a charging voltage to the charging component 206. The first current is measured as the charging component 206 applies the voltage to the photoconductive surface 204. Any perturbation in the received data (i.e., the data indicative of a measurement of a first current) may affect the quality of printed images. A local electrical perturbation may be indicative of a point defect, which may be in, on or under the photoconductor surface 204. The presence of such a point defect leads to an increase in the DC current. The current measured may comprise an AC current or a DC current. However, in some examples, measuring the DC current may lead to a more accurate determination of the existence of a point defect.

The processing circuitry 202 is to determine, responsive to detecting an increase in the measured first current relative to a reference current, the increase being greater than a first defined threshold current, that there exists a point defect affecting the latent image. In other words, if a spike in the data is greater than a threshold increase, then it may be determined that there exists a point defect that affects the photoconductive surface 204 or the latent image received on the photoconductive surface. The reference current relative to which the current increase is defined maybe be considered, in a general sense, to be a baseline current that is measured as the voltage is applied to the photoconductive surface 204. For example, an average of the current over a period of time, or over an extend of the photoconductive surface 204, may be taken and used as the reference current. The reference current, which may be considered to be dynamic or changing, may be considered to be a transformed version of the measured current, obtained by processing the measured current. As described in greater detail below, additional processing may be performed on the received data in order to improve the accuracy of the determination of the presence of a point defect. This may help to smooth out any small changes in current over the photoconductive surface 204.

The processing circuitry 202 is to generate instruction data responsive to determining that there exists a point defect affecting the latent image. The instruction data may comprise data to instruct a device to perform an appropriate action. In one example, the instruction data may comprise data to instruct a device to generate an alert to be delivered to a user interface. For example, the instruction data may instruct a device to deliver a message (e.g., an SMS message or email) to a user interface of a computer mobile device of an operator of the print apparatus. Upon receipt of the alert or message, the operator may take action to clean the photoconductive surface. In a further example, if it is determined that a point defect exists, then the instruction data may instruct the print apparatus 100, 200 to stop printing, or to take some other action to avoid images to be printed that include print quality defects.

In some examples, the measured first current may comprise one of a series of current measurements in the received data, the measurements taken at different positions on a surface of the charging component 206 as the charging component moves relative to the photoconductive surface 204. For example, as the charging component 206 applies a voltage to different positions on the photoconductive surface 204, the resulting current may be measured, so that each measurement in the series of current measurements corresponds to a position of the photoconductive surface where the voltage is applied when the current is measured.

The processing circuitry 202 may determine, responsive to detecting an increase in any measured current in the received data by more than the first defined threshold current, that there exists a point defect affecting the latent image. In this way, if a spike is detected anywhere in the data, then it may be determined that photoconductive surface 204 includes a point defect. In some examples, the data may include multiple spikes, indicating multiple increases in the current, each corresponding to a different position on the photoconductive surface 204. In this case, it may be determined that the photoconductive surface 204 includes multiple point defects, such as multiple objects causing the current increases.

The number of measurements included in the series of current measurements in the data may be selected according to the nature of the print apparatus 100, 200 and/or the photoconductive surface 204 in the print apparatus. In an example, the photoconductive surface 204 may be formed around a cylindrical substrate (e.g., a drum or roller), and 360 current measurements (i.e., samples) may be obtained over the extent of the photoconductive surface, corresponding to one measurement at each degree of rotation of the photoconductive surface 204. In this way, with knowledge of the position on the photoconductive surface 204 that the current spike occurs, it is possible to determine the approximate position of the point defect relative to the photoconductive surface 204. In examples where the photoconductive surface 204 is in the form of, or formed on, a drum or roller, the approximate position may be given in terms of an angular position (e.g., an indication of the angular position relative to a reference position) on the photoconductive surface. Knowledge of the position makes it easier for an operator tasked with cleaning the photoconductive surface to locate the point defect.

In some examples, multiple sets of current measurements corresponding to the photoconductive surface 204 may be analyzed in order to reduce the likelihood that a spike in the data is caused by noise. For example, if current measurements are recorded at positions corresponding to locations over the extent of the photoconductive surface 204, then multiple sets of the measurements may be averaged. If the photoconductive surface 204 is in the form of, or formed on, a drum or roller, then a point defect at a particular position may cause a current increase (e.g., a spike in the data) at the same position during each revolution the drum or roller. Thus, measurements acquired during a number (e.g., 10) of consecutive drum cycles may be averaged and analyzed to detect point defects.

As noted above, the received data may be processed in order to improve the accuracy of the determination made. In some examples, the processing circuitry may apply a low-pass filter to the received data. Applying such a filter can remove high-frequency noise from the data. In some examples, low-pass filtering of the data may be done using a moving average (e.g., a rolling average) of a number of successive samples. In an example, a sample window of 5 (e.g., 5 degrees) may be used (i.e., in the example discussed above where the photoconductive surface 204 is formed or mounted on a roller or drum, the rolling window size is 5 degrees). A window size of 5 samples may be selected to maintain sufficiently high frequency information (e.g., current spikes) while filtering out higher frequency noise. Put mathematically, the moving average, MA, for a window size, W, of 5 degrees, can be denoted as:

$$MA_i=[I_{i-2}+I_{i-1}+I_i+I_{i+1}+I_{i+2}]/5$$

where I is the measured current, and i is the sample number or angle.

In some examples, the processing circuitry is to apply a differentiator filter to the received data. The differentiator filter may sometimes be referred to as a differentiating digital filter. The data, once filtered by the differentiator filter, is centered around 0, which makes it easier to apply thresholding in order to detect a current spike indicative of a point defect affecting the photoconductive surface 204 or the latent image. Differentiation of the data transforms a positive spike in the data into an adjacent positive and negative spike. Amplitudes of these adjacent positive and negative spikes are typically identical. In other words, each current peak appearing in the received data is converted into a pair of adjacent spikes centered around zero: a positive spike having a positive amplitude and a negative spike having a negative amplitude. Put mathematically, the filtered data, F, following filtering with the differentiator filter, may be defined as:

$$F_i=[39*(I_{i+1}-I_{i-1})+12*(I_{i+2}-I_{i-2})-5*(I_{i+3}-I_{i-3})]/(96*\Delta\alpha)$$

where $\Delta\alpha$=1 degree. The coefficients 39, 12, 5 and 96 are values obtained from literature, and are relevant for a differentiator filter.

Following the filtering of the data, the adjacent positive and negative spikes that correspond to the current spikes in the original received data may be compared to positive and negative thresholds (with the positive and negative thresholds being equal in absolute values) in order to determine whether or not the spikes are likely to be caused by a point defect associated with the photoconductive surface 204. In some examples, a threshold looking technique may be applied, whereby the spikes are first compared to a large, maximum threshold. If the large threshold is exceeded, then it may be determined that a point defect exists and, if not, the spikes are compared to a second, smaller threshold. Again, if the second threshold is not exceeded, then the spikes are compared to a third, even smaller threshold. This process may be repeated until it may be determined that, if the current increase corresponding to the spikes does not exceed a smallest threshold, it may be determined that no point defect is present that is affecting the photoconductive surface 204 or the latent image at a location corresponding to the spike.

Thus, the processing circuitry 202 may, responsive to determining that the increase in the measured first current relative to the reference current is less than the first defined threshold current, compare the increase in the measured first current to a second defined threshold current, the second defined threshold current being lower than the first defined threshold current. The reference current here (i.e., following processing of the obtained measurements) may be considered to be zero, since the spikes in the data following filtering are centered around zero. Thus, if the increase in the measured first current (i.e., the spike) does not exceed the first, maximum threshold, then it is compared to the second, smaller threshold. It will be understood that the reference current relative to which the current increase (e.g., a current spike) is measured may vary over the photoconductive surface 204 and/or depending on the components used and the voltage applied to the photoconductive surface. Following further processing, as discussed below, the comparison to thresholds may be done using the processed (e.g., filtered) data.

Thus, the processing circuitry 202 may determine, responsive to determining that the increase in the measured first current is greater than the second defined threshold current, that there exists a point defect affecting the latent image.

If the current spike (i.e., the current increase) is less than the second defined threshold current, then it may be compared to a third, even lower threshold. In some examples, the above process may be repeated, whereby, if the current increase is lower than the third threshold, it is compared to an even lower threshold, until a defined number of incrementally decreasing thresholds have been considered. If the current spike does not exceed the final threshold, then it may be determined that the spike is caused by noise, and not a point defect associated with the photoconductive surface 204. In some examples, the third threshold may be the lowest threshold against which the current spike is compared.

Thus, in some examples, the processing circuitry 202 may, responsive to determining that the increase in the measured first current relative to the reference current is less than the second defined threshold current, compare the increase in the measured first current to a third defined threshold current, the third defined threshold current being lower than the second defined threshold current. The third defined threshold may be representative of a level of noise in the data, and/or may be selected as a level below which there is likely to be little or no impact on print quality if the photoconductive surface 204 were to be used in a printing operation.

The processing circuitry 202 may determine, responsive to determining that the increase in the measured first current is less than the third defined threshold current, that the increase in the measured first current does not correspond to a point defect affecting the latent image. Again, if the data containing the indication of the measurement of the first current is processed further, as described herein, the comparison to thresholds may be done using the processed data, such as the filtered data, F.

Put mathematically, applying a threshold to the filtered data, F, may be represented in the following way. Recall that the differentiator filter generates adjacent pairs of positive and negative peaks (e.g., a positive peak followed by a negative peak) for each current increase in the original data. An initial threshold, T, is set. In some examples, the threshold, T, may, in an example, be set at 5. The threshold T may be set at the minimum value below which no spike (above a meaningful threshold) is considered to exist. The following rules may then be applied:

If $-T<F<T$, then set F to 0;

If $F<-T$, then set F to $-1$;

If $F>T$, then set F to 1.

The data transformed by the thresholding process may be called $Q_i$, with values $-1$, 0 and 1. If a negative peak is present for a particular sample, i, in the transformed data, $Q_i$, then the samples that precede that sample i are analyzed. In some examples, the preceding 5 samples may be analyzed. If the sum of the preceding samples is greater than 1, then it may be determined that the peak identified at sample i is a genuine peak/spike, rather than noise. Thus, mathematically:

if $Q_i=-1$, then if the sum of $(Q_{i-5}+Q_{i-4}+Q_{i-3}+Q_{i-2}+Q_{i-1})>1$ then a peak is detected; otherwise, it is determined that no peak is present.

In some examples, peaks detected in particular regions of the photoconductive surface 204 may be excluded or disregarded. For example, such regions may correspond to a join or seam of the photoconductive surface, which are not used in a printing operation.

As noted above, the print apparatus 100, 200 may comprise any type of print apparatus having a photoconductive surface 204 and a charging component 206 to apply a voltage to the photoconductive surface. In some examples, the print apparatus 200 may comprise a liquid electrophotography (LEP) print apparatus. In such examples, the photoconductive surface 204 may be mounted on a drum or roller. The charging component 206 may apply the voltage to the photoconductive surface 204 as the charging component moves relative to the photoconductive surface.

In other examples, different techniques may be used for identifying data features. For example, matched filtering may be used to identify peaks or spikes by comparing the data to a template that includes peaks or spikes that might be expected. Other techniques based on wavelet transform may be used, or techniques involving analysis-based feature identification, for example.

The spike detection analysis discussed herein may be repeated at intervals (e.g., periodically) over the life of the photoconductor surface 204. For example, the analysis may be performed after a defined number of print cycles. The analysis may be performed during a printing operation before a printing operation or after a printing operation.

Figure 3:
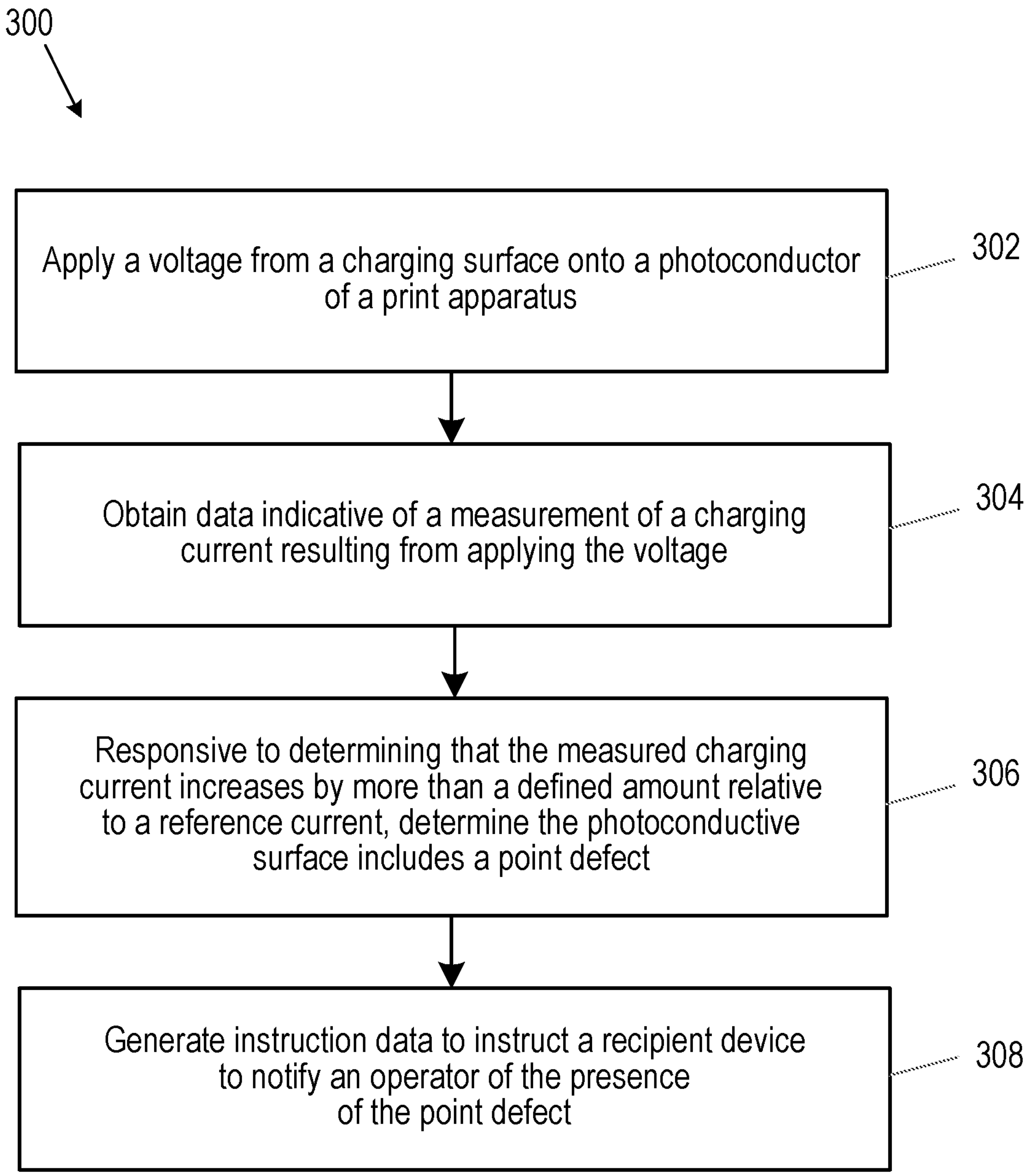
FIG. 3 a flowchart of an example of a point defect detection method.

The present disclosure also provides a method. FIG. 3 is a flowchart of a method 300, such as a method of detecting a point defect in a print apparatus 200. At block 302, the method 200 comprises applying a voltage from a charging surface onto a photoconductor of a print apparatus 200. The photoconductor may comprise or be similar to the photoconductive surface 204, and the charging surface may comprise the surface of the charging component 206. The method comprises, at block 304, obtaining data indicative of a measurement of a charging current resulting from applying the voltage. As the voltage is applied, the charging current may be measured, and provided as part of the obtained data (i.e., the data obtained in block 304). As noted above, the photoconductive surface 204 may be mounted on a roller or drum and/or may rotate relative to the charging component 206. Thus, the current may be measured as the photoconductive surface 204 and the charging component 206 rotate relative to one another. At block 306, the method 300 may comprise, responsive to determining that the measured charging current increases by more than a defined amount relative to a reference current, determining the photoconductive surface includes a point defect. A point defect is referred to as such because the defect is a localized defect which may cause a print quality defect to appear in a printed image in the form of a point mark or a star-shaped mark. The method 300 may comprise, at block 308, generating instruction data to instruct a recipient device to notify an operator of the presence of the point defect. For example, the instruction data may instruct the recipient device to deliver a message to the operator, prompting the operator to clean the photoconductive surface 204 to remove any debris that may be causing the point defect. In some examples, the message to the operator may be delivered at an appropriate time, such as when a replaceable component of the photoconductor (e.g., a foil) is due for replacement. At this time, the replaceable component may be removed, and the underlayer may be cleaned.

Figure 4:
FIG. 4 is a flowchart of a further example of a point defect detection method.
Figure 5:
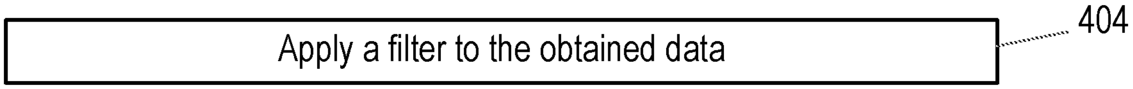
FIG. 5 is a flowchart of a further example of part of a point defect detection method.

FIGS. 4 to 9 are blocks of a flowchart of a method, such as a method of detecting a point defect in a print apparatus 200. The blocks shown in FIGS. 4 to 9 may be performed in addition to blocks of the method 300, individually or in combination. In some examples, the instruction data may instruct a recipient device to notify a party of the existence of the point defect and, in addition, instruction data may be generated, instructing a recipient to clean the photoconductive surface 204. Thus, as shown in FIG. 4, the method may further comprise, at block 402, generating instruction data comprising an instruction to perform a cleaning task associated with the photoconductive surface As described above, various processing techniques may be implemented in order to improve the accuracy of the determination of the presence of a point defect. Thus, as shown in FIG. 5, the method may comprise, at block 404, applying a filter to the obtained data. The filter may comprise a filter selected from a group comprising: a low-pass filter; and a differentiator filter. In some examples, both a low-pass filter and a differentiator filter may be applied and, in other examples, other filters may additionally be applied.

Figure 6:
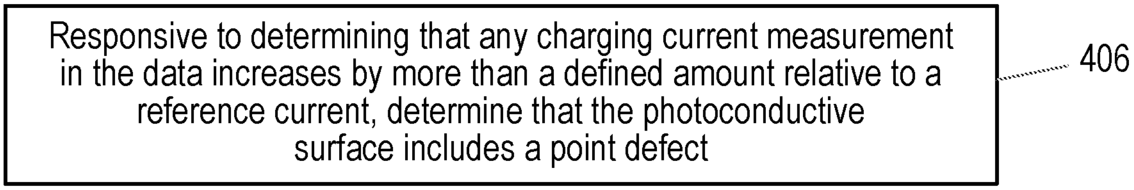
FIG. 6 is a flowchart of a further example of part of a point defect detection method.

The measured charging current (e.g., the charging current of which the measurement is indicated in the data obtained at block 302) comprises one of a plurality of charging current measurements in the obtained data, the measurements taken at different positions on a surface of the charging surface as the charging component 206 surface applies the voltage at different positions on the photoconductive surface 204. Thus, as shown in FIG. 6, in some examples, the method may comprise, at block 406, responsive to determining that any charging current measurement in the obtained data (or filtered data) increases by more than a defined amount relative to a reference current, determining that the photoconductive surface 204 includes a point defect. Thus, if a current spike occurs at any location on the photoconductive surface 204 then instruction data may be generated to instruct a recipient device to notify an operator of its presence. In this way, the entire surface of the photoconductive surface 204 may be monitored for point defects.

Figure 7:
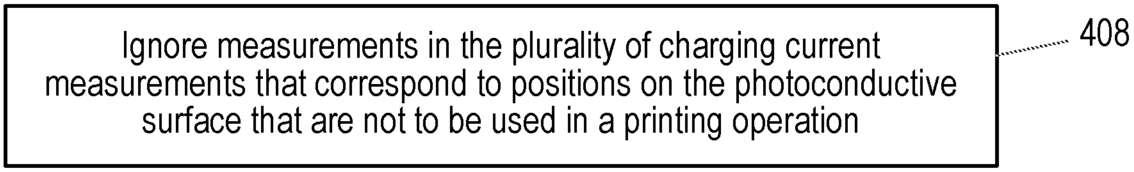
FIG. 7 is a flowchart of a further example of part of a point defect detection method.

In some examples, there may be regions of the photoconductive surface 204 that are not used in a printing operation, and/or do not receive a latent image representative of the image to be printed onto the printable substrate. For example, such regions may include the area around a seam or join in the photoconductive surface 204. Current measurements acquired in those regions may be excluded from the analysis or, in some examples, measurements may not be acquired in those regions. Thus, as shown in FIG. 7, in some examples, the method may comprise, at block 408, ignoring measurements in the plurality of charging current measurements that correspond to positions on the photoconductive surface that are not to be used in a printing operation.

Figure 8:
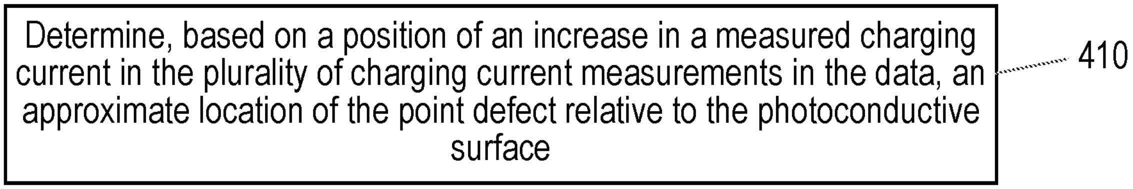
FIG. 8 is a flowchart of a further example of part of a point defect detection method.

As shown in FIG. 8, at block 410, the method may comprise determining, based on a position of an increase in a measured charging current in the plurality of charging current measurements in the obtained data, an approximate location of the point defect relative to the photoconductive surface. For example, if a first current measurement is taken at a position corresponding to 0 degrees on the photoconductive surface 204, measurements are taken every 1 degree, and a current spike is detected in a measurement corresponding to 180 degrees round the photoconductive surface, then it may be determined that a point defect exists at approximately halfway around the photoconductive surface relative to the first measurement. An operator may locate the angular location around the drum where the point defect is located, and this would make it easier to identify the position of the point defect along the length of the photoconductive surface 204 (e.g., along the length of the roller/drum).

Figure 9:
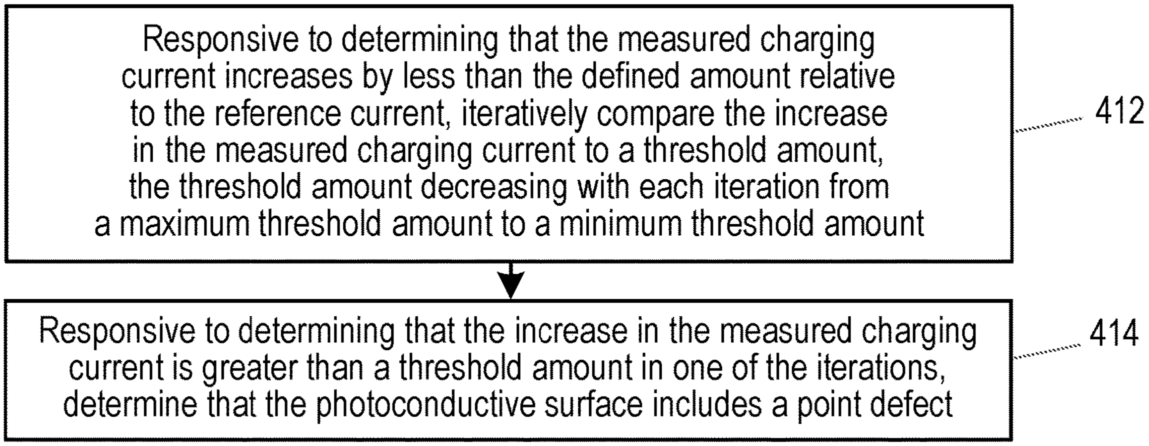
FIG. 9 is a flowchart of a further example of part of a point defect detection method.

As shown in FIG. 9, the method may, in some examples, further comprise, at block 412, responsive to determining that the measured charging current increases by less than the defined amount relative to the reference current, iteratively comparing the increase in the measured charging current to a threshold amount, the threshold amount decreasing with each iteration from a maximum threshold amount to a minimum threshold amount. The comparison to the incrementally decreasing thresholds may be referred to as threshold looping, as discussed above. Responsive to determining that the increase in the measured charging current is greater than a threshold amount in one of the iterations, the method may comprise, at block 414, determining that the photoconductive surface 204 includes a point defect. In some examples, if it is determined that the increase in the measured charging current is lower than the minimum threshold amount, then it may be determined that the photoconductive surface 204 does not include a point defect.

Blocks of the methods disclosed herein may be performed by, or using, a processor or processing apparatus (e.g., the processor 102 or the processing circuitry 202), and may comprise such processing circuitry operating a component or multiple components to cause the functions described in the blocks to be performed. As such, the method 300 may be considered to be a computer-implemented method. For example, at block 302, a processor may operate the charging component/surface 206 to apply a voltage onto a photoconductor of a print apparatus.

Figure 10:
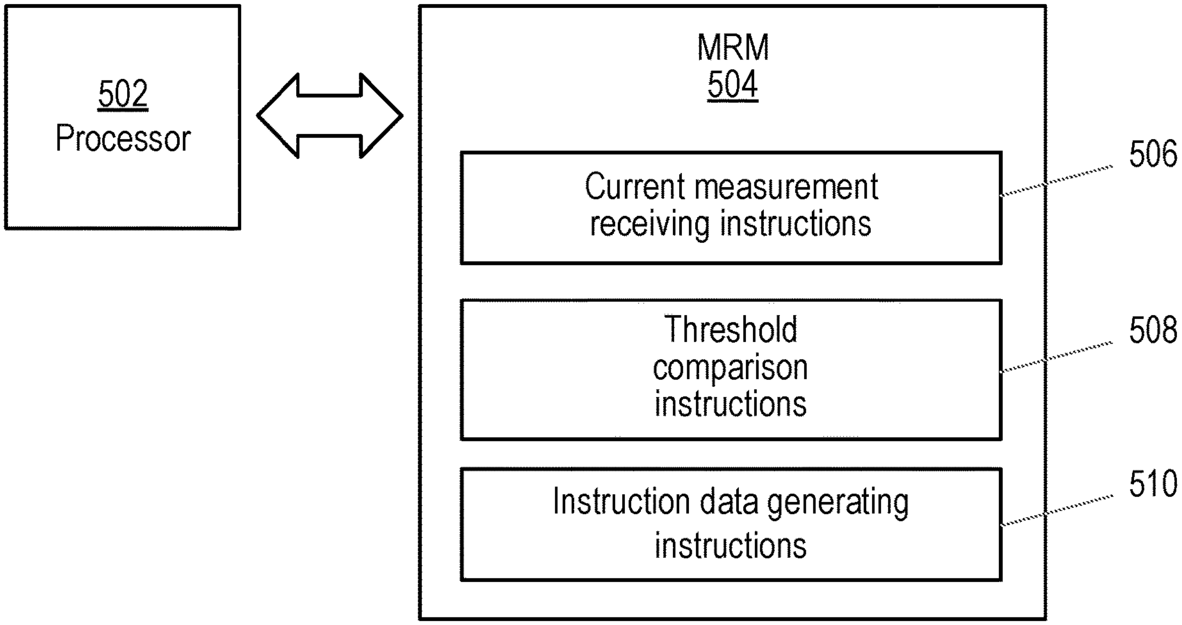
FIG. 10 is a schematic illustration of an example of a machine-readable medium in communication with a processor.

The present disclosure also provides a machine-readable medium. FIG. 10 is a schematic illustration of an example of a processor 502 in communication with a machine-readable medium 504. The machine-readable medium 504 comprises instructions which, when executed by the processor 504, cause the processor to perform tasks, such as the tasks defined in the blocks of the method 300. In an example, the machine-readable medium 504 comprises instructions (e.g., current measurement receiving instructions 506) which, when executed by the processor 504, cause the processor to receive a current measurement associated with a voltage applied from a charge generator (e.g., the charging component 206) onto a photoconductive surface 204 of a print apparatus 100, 200. The machine-readable medium 504 comprises instructions (e.g., threshold comparison instructions 508) which, when executed by the processor 504, cause the processor to determine whether the current increases by more than a threshold amount. The machine-readable medium 504 comprises instructions (e.g., instruction data generating instructions 510) which, when executed by the processor 504, cause the processor to, responsive to determining that the current has increased by more than a threshold amount, generate instruction data to cause a recipient to be alerted to the current increase. For example, the instruction data may instruct a recipient device to display a message alerting the recipient (e.g., an operator) of the current increase.

As described above, the present disclosure provides a mechanism by which possible point defects (e.g., objects such as debris that may affect the photoconductive surface 204 or the latent image) may be detected by monitoring a current resulting from the voltage applied to the photoconductive surface 204 by a charging component 206. Such a point defect gives rise to a localized increase in current, and by processing current measurements in the manner described herein, an accurate determination of the presence of such a point defect may be made. An identified point defect may be rectified (e.g., the photoconductive surface may be cleaned) in a timely manner, reducing the number of defective prints made using the photoconductive surface, meaning that the number of print operations including print quality defects is reduced, and the number of cleaning operations of the photoconductive surface when no point defects are present can be reduced.

Examples in the present disclosure can be provided as methods, systems or machine-readable instructions, such as any combination of software, hardware, firmware or the like. Such machine-readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer-readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited just by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print apparatus comprising:

a rotatable photoconductor having a photoconductive surface to receive a latent image representative of an image to be printed onto a printable substrate;

a charging component to apply a voltage to the photoconductive surface as the photoconductor rotates about an axis; and processing circuitry to:

receive data indicative of a measurement of current resulting from the voltage applied by the charging component;

determine sample current values corresponding to respective rotation angle positions of the photoconductor about the axis;

filter the sample current values;

determine, responsive to detecting a spike in the filtered sample current values being greater than a threshold, that there exists a point defect affecting the latent image; and generate instruction data responsive to determining that there exists a point defect affecting the latent image.

2. A print apparatus according to claim 1, wherein filtering the sample current values includes applying a low-pass filter.

3. A print apparatus according to claim 2, wherein applying a low pass filter includes applying a moving average for a window size.

4. A print apparatus according to claim 1, wherein filtering the sample current values includes applying a differentiator filter.

5. A print apparatus according to claim 1, wherein determining, responsive to detecting a spike in the filtered sample current values being greater than a threshold, that there exists a point defect affecting the latent image includes:

responsive to determining that the spike is greater than a first defined threshold, that there exists a point defect affecting the latent image;

responsive to determining that the spike is less than the first defined threshold current, compare the spike to a second defined threshold current, the second defined threshold current being lower than the first defined threshold current; and determine, responsive to determining that the spike is greater than the second defined threshold current, that there exists a point defect affecting the latent image.

6. A print apparatus according to claim 5, wherein the second threshold corresponds to a noise level threshold.

7. A print apparatus according to claim 1, wherein the instruction data comprises data to instruct a device to generate an alert to be delivered to a user interface.

8. A method comprising:

applying a voltage from a charging surface onto a rotatable photoconductor of a print apparatus;

obtaining data indicative of a measurement of a charging current resulting from applying the voltage, wherein data includes sample current values corresponding to respective rotation angle positions of the photoconductor about an axis;

filtering the sample current values;

responsive to detecting a spike in the filtered sample current value being greater than a threshold, determining the photoconductive surface includes a point defect; and generating instruction data to instruct a recipient device to notify an operator of the presence of the point defect.

9. A method according to claim 8, further comprising:

generating instruction data comprising an instruction to perform a cleaning task associated with the photoconductive surface.

10. A method according to claim 8, further comprising:

wherein the photoconductor includes regions used in a printing operation and regions not used in a printing operation and wherein the respective rotation angle positions correspond to regions of the photoconductor used in a printing operation.

11. A method according to claim 8, further comprising: determining, based on a respective rotation angle position of a spike, an approximate location of the point defect relative to the photoconductive surface.

12. A method according to claim 8, wherein determining the photoconductive surface includes a point defect, responsive to detecting a spike in the filtered measured current value being greater than a threshold, includes:

iteratively comparing the spike to a threshold amount, the threshold amount decreasing with each iteration from a maximum threshold amount to a minimum threshold amount; and responsive to determining that the spike is greater than a threshold amount in one of the iterations, determining that the photoconductive surface includes a point defect.

13. A method according to claim 8, wherein filtering the sample current values includes applying a low-pass filter.

14. A method according to claim 13, wherein applying a low pass filter includes applying a moving average for a window size.

15. A method according to claim 8, wherein filtering the sample current values includes applying a differentiator filter.

16. A machine-readable medium comprising instructions which, when executed by a processor, cause the processor to:

receive data indicative of a current measurement associated with a voltage applied onto a photoconductive surface of a rotatable photoconductor of a print apparatus, wherein the data includes sample current values corresponding to respective rotation angle positions of the photoconductor about an axis;

filtering the data;

determine whether a spike in the filtered data is greater than a threshold amount; and responsive to determining that a spike is greater than a threshold amount, generate instruction data to cause a recipient to be alerted to the current increase.

17. A machine-readable medium according to claim 16, wherein filtering the data includes applying a low-pass filter.

18. A machine-readable medium according to claim 17, wherein applying a low pass filter includes applying a moving average for a window size.

19. A machine-readable medium according to claim 16, wherein filtering the data includes applying a differentiator filter.

* * * * *